United States Patent
Klotz

(10) Patent No.: US 7,824,597 B2
(45) Date of Patent: Nov. 2, 2010

(54) METHOD AND APPARATUS FOR MAKING FLAT MOLDED PLASTIC ARTICLES

(75) Inventor: Bernd Klotz, Bergkirchen (DE)

(73) Assignee: KraussMaffei Technologies GmbH, München (DE)

( * ) Notice: Subject to any disclaimer, the term of this patent is extended or adjusted under 35 U.S.C. 154(b) by 1461 days.

(21) Appl. No.: 10/789,412

(22) Filed: Feb. 27, 2004

(65) Prior Publication Data

US 2004/0217502 A1    Nov. 4, 2004

Related U.S. Application Data

(63) Continuation of application No. PCT/EP02/09098, filed on Aug. 14, 2002.

(30) Foreign Application Priority Data

Aug. 27, 2001  (DE) .............................. 101 41 858

(51) Int. Cl.
B29C 45/57 (2006.01)
(52) U.S. Cl. .................. 264/328.7; 264/328.8
(58) Field of Classification Search ............... 264/328.8
See application file for complete search history.

(56) References Cited

U.S. PATENT DOCUMENTS

| | | | |
|---|---|---|---|
| 4,828,769 A | 5/1989 | Maus et al. | |
| 4,986,938 A | 1/1991 | Izuka et al. | |
| 5,059,364 A * | 10/1991 | Okubo et al. | 264/40.1 |
| 5,340,528 A * | 8/1994 | Machida et al. | 264/328.7 |
| 5,776,407 A * | 7/1998 | Takeda | 264/328.7 |
| 6,328,920 B1 * | 12/2001 | Uchiyama et al. | 264/255 |

FOREIGN PATENT DOCUMENTS

| | | |
|---|---|---|
| DE | 1529907 | 12/1971 |
| DE | 22 65 090 A1 | 2/1977 |
| DE | 29 14 076 A1 | 10/1980 |
| DE | 39 17 361 A1 | 9/1990 |
| DE | 29811214 U1 | 10/1998 |
| DE | 19903114 A1 | 8/2000 |
| EP | 0 144 622 A1 | 10/1984 |
| EP | 0 144 622 B1 | 10/1984 |
| GB | 1110534 | 4/1968 |
| JP | 62255111 | 11/1987 |
| JP | 63009523 | 1/1988 |
| JP | 04035922 | 2/1992 |
| JP | 06312444 | 11/1994 |
| WO | WO 98/10417 | 3/1998 |
| WO | WO 98/53975 | 3/1998 |

OTHER PUBLICATIONS

Jens Breitenbach: "Spitzprägen un seine Variationen in der Praxis", in: PLastikverarbeiter, vol. 19, No. 7, 1968, pp. 517-524.

* cited by examiner

*Primary Examiner*—Monica A Huson
(74) *Attorney, Agent, or Firm*—Henry M. Feiereisen; Ursula B. Day

(57) ABSTRACT

In a method for producing flat molded plastic parts, for example panes, a mold is first filled completely with plastic material and additional plastic material is subsequently added, in such a way that the mold distends in a defined manner in opposition to the clamping force. The distension compensates for material shrinkage during a subsequent cooling operation, thus preventing sink marks and permitting the production of, for example, panes of high optical quality.

8 Claims, 4 Drawing Sheets

METHOD AND APPARATUS FOR MAKING FLAT MOLDED PLASTIC ARTICLES

CROSS-REFERENCES TO RELATED APPLICATIONS

This application is a continuation of prior filed copending PCT International application no. PCT/EP02/09098, filed Aug. 14, 2002, which designated the United States and on which priority is claimed under U.S.C. §120, the disclosure of which is hereby incorporated by reference.

This application claims the priority of German Patent Application, Serial No. 101 41 858, filed Aug. 27, 2001, pursuant to 35 U.S.C. 119(a)-(d), the disclosure of which is incorporated herein by reference.

BACKGROUND OF THE INVENTION

The present invention relates to a method and apparatus for making thick-walled, flat molded plastic articles, in particular plastic discs.

There is an increasing tendency, in particular in the automobile industry, to substitute glass panes with plastic panes because plastic panes are lighter in weight and shatter-resistant. However, conventional manufacturing processes are unable to make plastic panes with adequate and reproducible surface quality so that their use in the automobile industry has been limited to sun roofs but has not been viable enough for use as a side window, rear window, or windshield.

Optical surfaces of small-area items with even wall thickness are normally produced, using an injection molding process, whereby a plastic mass is introduced during the filling stage into a mold cavity via small passages. As amorphous plastics exhibit a high reduction in thickness (material shrinkage of about 10 to 20%) during the cool-down phase, the material shrinkage is compensated during a subsequent holding pressure phase through addition of plastic melt to the injection piston of the injection molding machine. However, such a process leads to inhomogeneities so that its application for large-area articles is unsuitable.

In a so-called standard injection compression process, plastic mass is supplied in a first filling phase into a pre-enlarged cavity, and subsequently compressed by closing the mold. Such an injection compression process is appropriate for simple optical items such as lenses because the compression prevents the formation of sink marks as a result of material shrinkage. However, large-area plastic items, such as slabs of several square meters, cannot be reproducibly made because of the difficulty to maintain a precise enough compression stroke. The automobile industry, for example, requires precision of less than tenth of millimeter which cannot be reproducibly implemented by the machines involved here, which apply clamping forces exceeding 2000 tons.

European patent publication no. EP-A-0144622 or U.S. Pat. No. 4,828,769 describes further variations of injection compression processes in which material pressed out from the cavity during the compression, or the compression phase is started already during the injection phase.

International publication no. WO 98/10417 describes a process of making very thin-walled plastic articles, such as compact discs. In this process, plastic mass is injected into a mold in such a way that the mold opens before the mold is fully filled.

International publication no. WO 98/53975 describes a mold with an elastically supported core which shifts during injection of plastic mass to subsequently compensate shrinkage losses. The elastic support results in a floating core system that is incapable of realizing a precisely defined wall thickness of the end product.

It would therefore be desirable and advantageous to provide an improved method and apparatus for making flat molded plastic articles to obviate prior art shortcomings and to be useful in making large-area plastic articles with good optical properties.

SUMMARY OF THE INVENTION

According to one aspect of the present invention, a method of making a molded plastic article, in particular a thick-walled, flat molded article such as a disc, includes the steps of closing a cavity of a positive mold by applying a clamping force, fully filling the cavity with plastic material, while maintaining a size of the cavity constant, adding plastic material so as to distend the positive mold in opposition to the clamping force until the positive mold reaches a defined product thickness, closing the positive mold until reaching a residual expansion opening and molding the plastic material into a plastic article while applying the clamping force to thereby maintain the plastic material in a compressed state, and removing the plastic article.

The present invention resolves prior art problems by completely filling the mold cavity of the positive mold and then adding further material so that the mold distends or expands. Thus, the compression phase is carried out while the mold is closed so that very precise compression strokes can be maintained.

In standard injection molding, the thickness of the molded plastic article is greatly dependent on the thickness of the cavity. This is precisely defined by the mold geometry. Unlike conventional injection compression processes, the process according to the present invention involves an intended floating condition of the cavity so that the thickness of the article is not defined by the cavity thickness but by the precision by which the material metering process is executed. Through integration of a displacement transducer of high resolution, it is possible to provide a wall thickness of the end product by the distending compression process according to the invention at a precision which is comparable to a standard injection molding process, but attains significantly better homogeneity and thus better optical properties of the end product.

As the injection mold is completely closed during distending compression during the initial process phase, the compression phase can commence after the filling phase from a defined position. The reproduction accuracy of the compression process is thus a function of the metering precision by which the injection unit operates and of the clamping force profile.

A one-sided distending of an injection unit can be realized by injecting material from one side upon a large-area cavity, whereby the internal pressure is greater in an area proximal to the sprue, or by providing the mold cavities in asymmetry to the injection unit. This effect can be opposed by applying a greater clamping force on the one side in opposition to the generated elevated opening force. This process may be realized, for example, by measuring the unilateral expansion and operating closing cylinders on the side of the unilateral opening with a greater clamping force than on the other side. This process may be carried out in a controlled manner so as to realize an absolutely parallel expansion of the mold.

According to another aspect of the present invention, an apparatus for making a molded plastic article, in particular a thick-walled, flat molded article such as a disc, includes a mold, a closing unit for closing the mold and applying a clamping force upon the closed mold, and a measuring device for ascertaining a distension of the closed mold in opposition to the clamping force.

The mold is implemented as a positive or compression mold and typically includes a fixed mold platen and a moving mold platen in parallel relationship, whereby the mold platens carry each a half-mold. Movement of the moving platen results in a closing of the mold at an adjustable clamping force. The fixed platen normally interacts with a screw by which plasticized material is introduced via a sprue channel through the fixed platen into the cavity of the mold. The moving platen is operated by a drive unit which also applies the clamping force. The drive unit may include four hydraulic cylinders which may be attached in corner areas of the platen, when the platen has a rectangular configuration. The use of electric drives may, of course, also be conceivable.

According to another feature of the present invention, at least one displacement transducer is provided upon the moving end platen for ascertaining a displacement of the moving platen as added material is filled into the cavity and the mold distends. In this way, the added material introduction can be carried out long enough until the mold platen and thus the mold assumes a precise position. Currently preferred is the arrangement of several displacement transducers, in particular in the area of the drives. In the event, the mold platen has zones that move differently, the clamping force of the drive unit can be increased in an area of greatest displacement, or reduced in areas of smallest displacement. In this way, the mold platen moves precisely in parallel alignment to ensure a precise parallel distension. This can be easily implemented in hydraulic machines that have individual drives with hydraulic systems that communicate with one another so that the compensation is achieved automatically.

In order to prevent overinjection of the mold contour, the use of generally known positive molds is preferred because their structure avoids escape of material from the mold, even when a half-mold moves.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
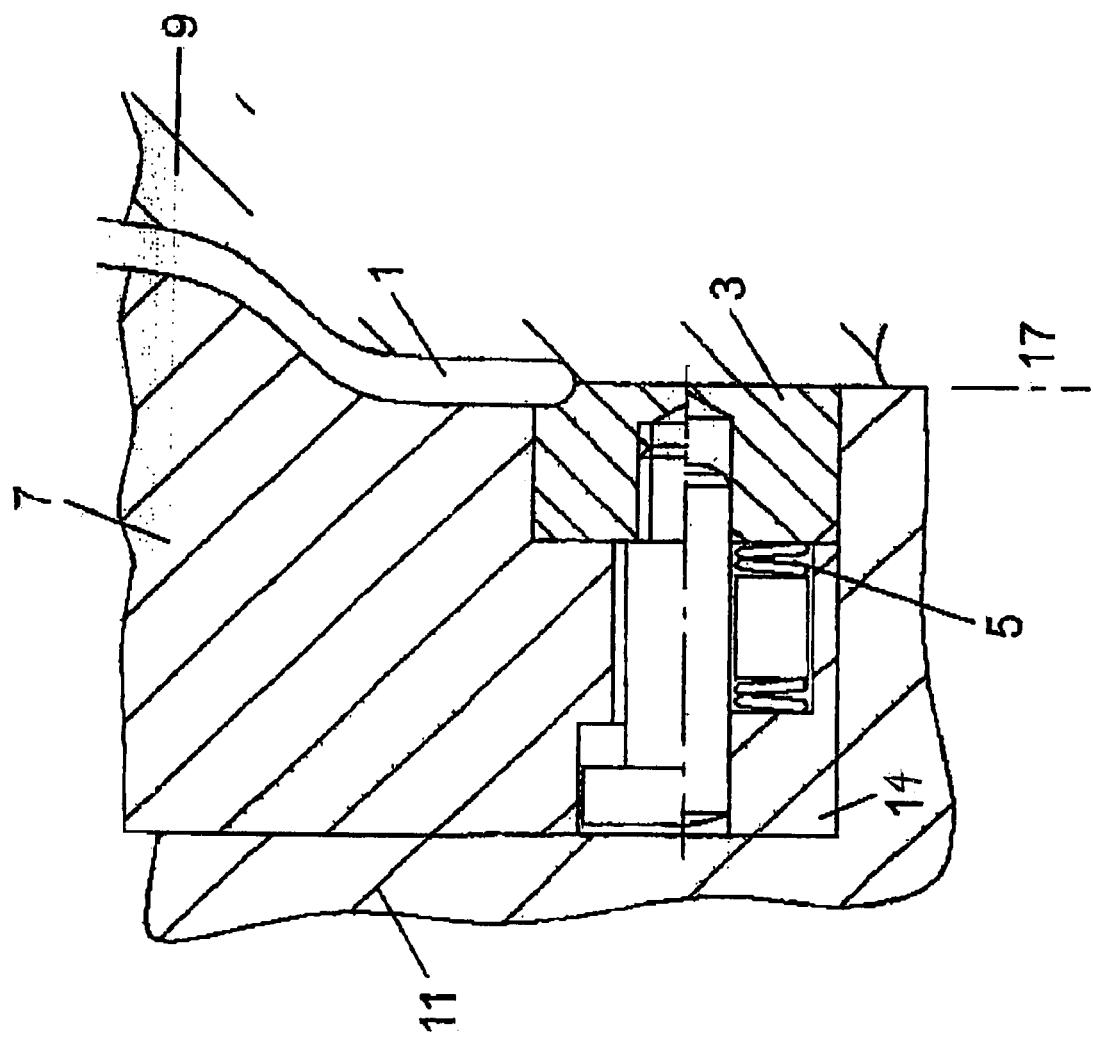
FIG. 1 is a fragmentary schematic cross sectional view of a mold for carrying out a process according to the present invention, illustrated during injection phase.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a fragmentary cross sectional view of an mold for carrying out a process according to the present invention. The mold is implemented as a positive or compression mold and typically includes a fixed mold platen (not shown) and a moving mold platen 11 in parallel relationship, whereby the mold platen 11 carries a half-mold 7, and the fixed platen carries a half-mold 9. The mold is closed by moving the moving platen 11 toward the fixed platen, thereby forming a cavity 1 between the half-molds 7, 9. The fixed platen normally interacts with a screw (not shown) of an injection unit by which plasticized material is introduced via a sprue channel through the fixed platen into the cavity 1 of the mold. The moving platen 11 is operated by a drive unit which also applies the clamping force. The drive unit may include four hydraulic cylinders for interaction with the moving platen 11. The edge of the cavity 1 is bounded by die inserts 3 which are supported via disk springs 5 by bearings 14 or the like, upon the moving platen 11. The dies 3 are so biased by the disk springs 4 as to be supported by the fixed half-mold 9 in the mold parting plane 17.

A specific construction of a type of mold involved here is described in commonly owned U.S. Pat. No. 6,280,174, the entire specification and drawings of which are expressly incorporated herein by reference. Reference is also made in this context to the so-called C series machines or MC series machines, commercially available by Krauss Maffei Kunststofftechnik GmbH, Germany. Thus, a further description of the mold is omitted for the sake of simplicity.

The process according to the present invention is as follows:

1. Injection Phase of Plastic Material (FIG. 1)

The injection phase is carried out, in analogy to a typical injection molding process, by injecting plastic material via at least one sprue (not shown). The injection operation is carried out until the cavity 1 is completely filled, whereby the end of the injection process can be made dependent on either a screw stroke, or time, or material pressure, or hydraulic pressure, or internal pressure. During the injection phase, the size of the cavity 1 remains constant, and the cavity 1 is completely closed at least during the injection phase.

A first optional compression phase may follow a complete filling of the cavity with plastic material. The size of the cavity is maintained constant during this step. If need be, additional plastic material may be added into the cavity of constant size by advancing the screw to thereby compress the plastic material in the cavity and to improve surface molding.

Figure 2:
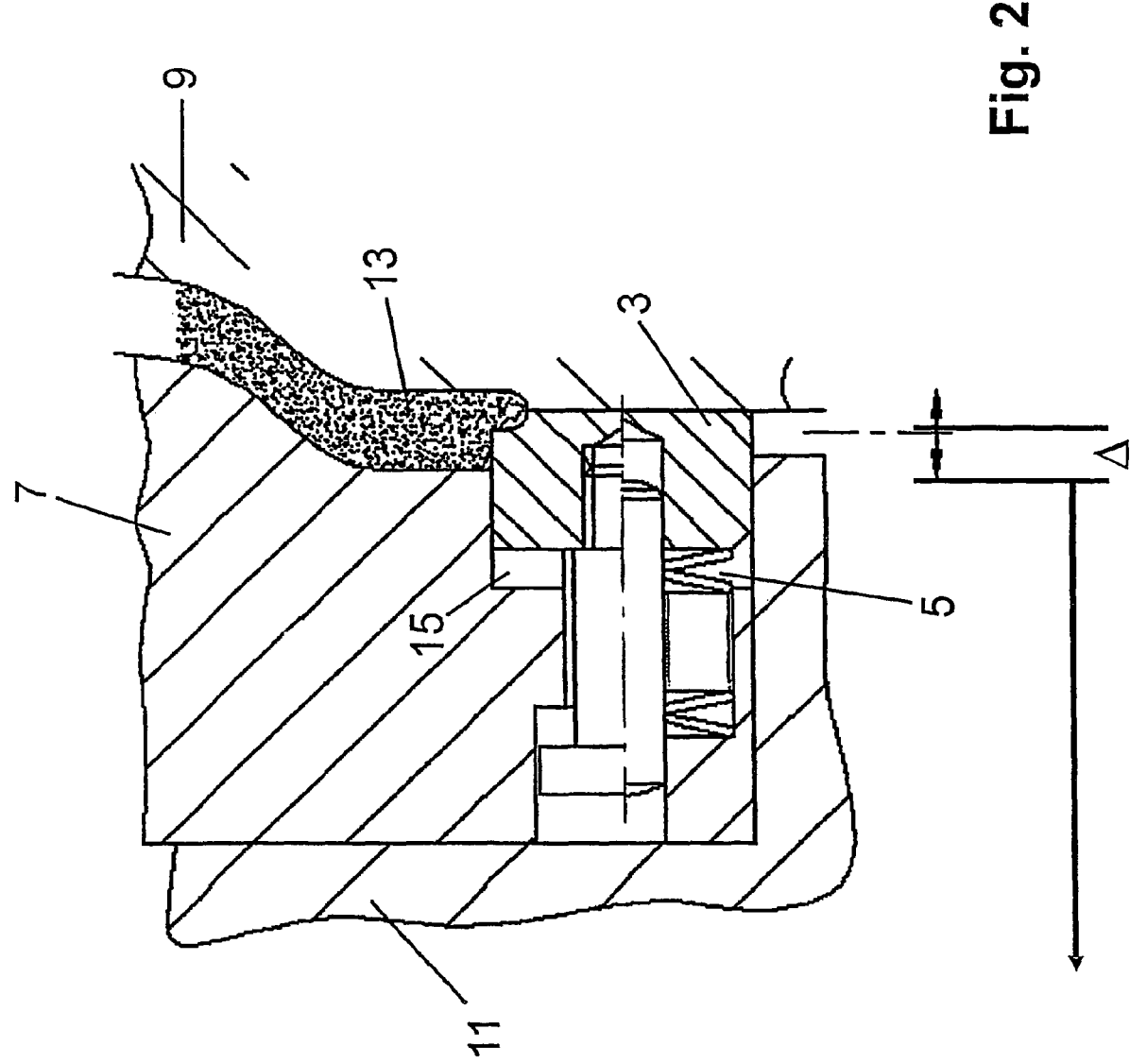
FIG. 2 is a fragmentary schematic cross sectional view of the mold during the distension phase.

2. Distending of the Cavity (FIG. 2)

During a further injection process, additional plastic material 13 is introduced into the cavity 1, thereby expanding the cavity 1 until the molded article has a defined wall thickness Δ. The disk springs 5 apply hereby a spring force upon the peripheral dies 3 to maintain contact of the peripheral dies 3 with the fixed half-mold 7. The distension phase is terminated in dependence on a screw stroke or travel of the movable mold 7. Currently preferred is a control of the distension phase on the basis of the screw stroke so as to realize a precise metering of the plastic mass and to achieve a precise reproducibility.

Although a displacement transducer may be attached to the moving platen 11, it is currently preferred to install into the mold a displacement transducer with high resolution in proximity of the injection site or sprue. Thus, already a slight distension of few tenth of millimeter can be determined and outputted as a signal. The distension distance Δ is minimal at the shrinkage volume of the article thickness and is, i.a., highly material dependent. In amorphous materials such as PC, PMMA or the like, the percentage value is about 8 to 15% of the article wall thickness. At typical wall thicknesses of four to six millimeters, the distension distance is >0.4 mm. Maximum value are about 0.9 mm.

During the distension phase, the generated internal pressure should be kept constant. Thus, the provision of an internal pressure sensor in the mold may be advantageous to control the process (internal pressure dependent clamping force profile).

A second optional compression phase that also involves adding of plastic material by advancing the screw may follow, whereby the article thickness remains at the reached thickness Δ, thereby compressing the plastic material.

The application of the afore-described compression phases is optional but currently preferred in order to realize an even formation of the product surface.

Figure 3:
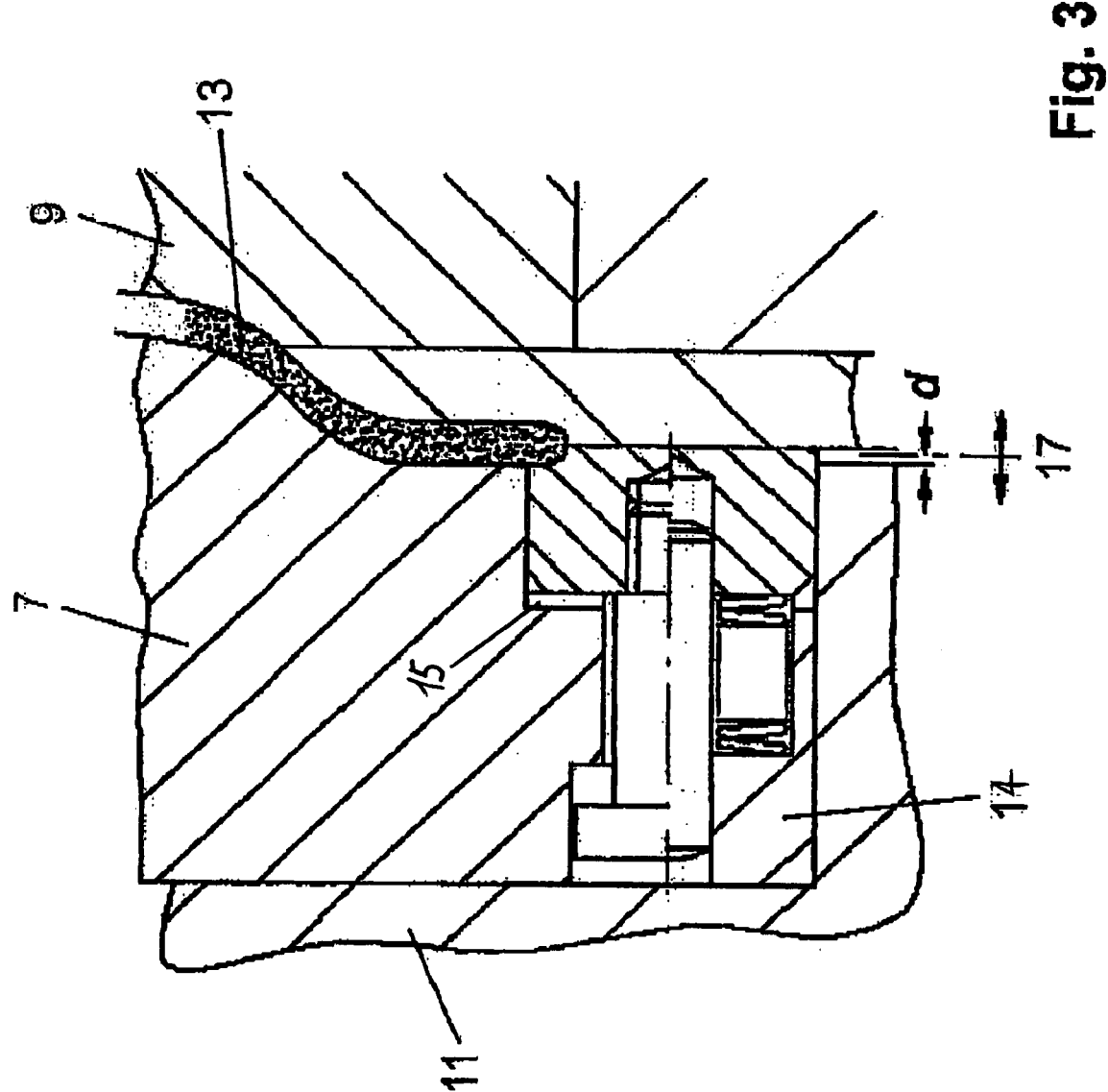
FIG. 3 is a fragmentary schematic cross sectional view of the mold during the compression phase.

Subsequently, the mold is closed until reaching a residual distending opening 15 and molding the plastic material into a plastic article while applying the clamping force to thereby maintain the plastic material compressed, This step corresponds to the mandatory compression phase, as described hereinafter and shown in FIG. 3.

3. Compression Phase (FIG. 3)

In this process phase, the plastic mass is maintained in compressed state to prevent material shrinkage to lead to sink marks, and a constant pressure profile is maintained and generated by suitably applying the clamping force. Of course, it is also conceivable to apply a constant clamping force. During the entire compression phase, the clamping movement compensates shrinking plastic material to prevent formation of sink marks on the product surface. Suitably, the dies 3 are so moved to a clamping position as to leave a residual distension opening 15 at the end of the cycle to ensure that the plastic mass is maintained under pressure during the entire cycle.

Figure 4:
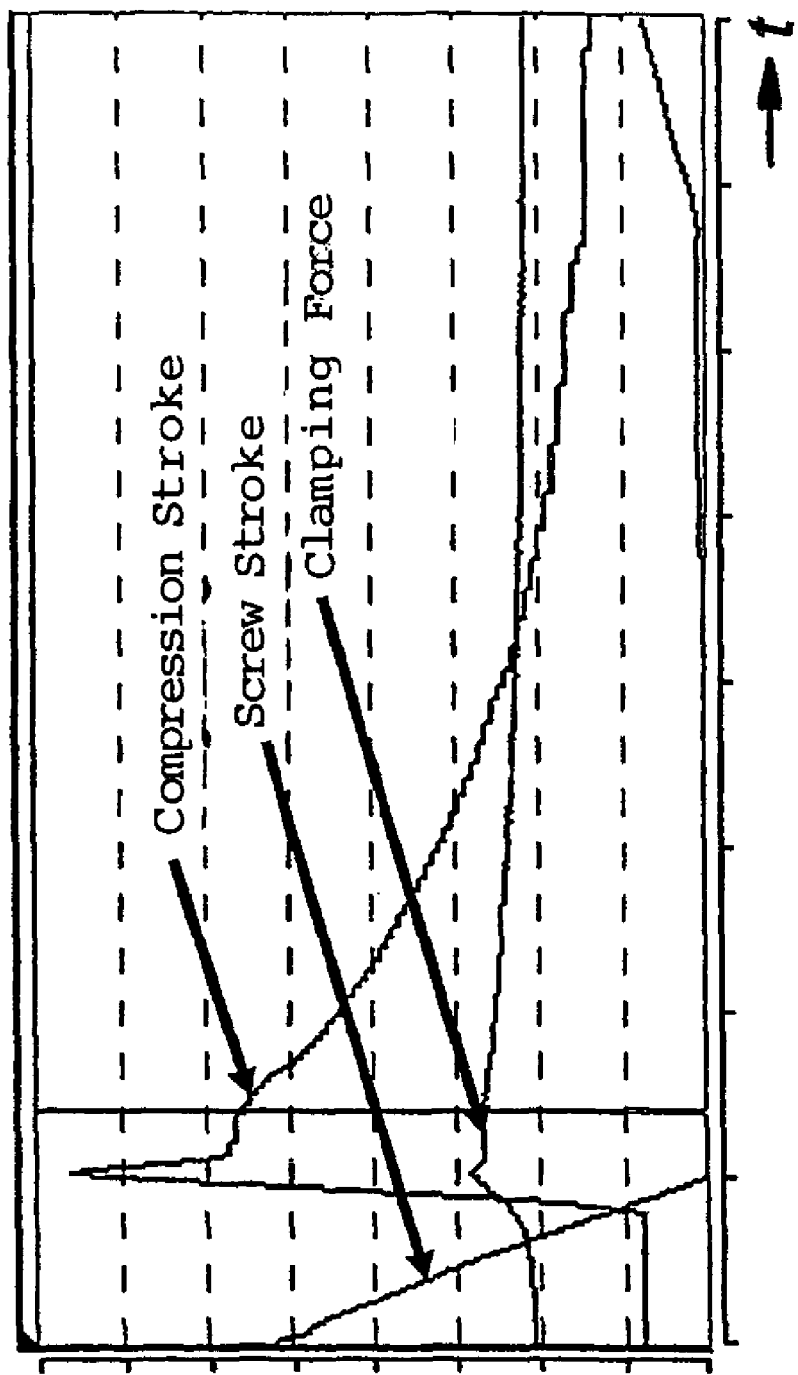
FIG. 4 is a graphical illustration of various parameters during an injection compression molding process according to the present invention.

Turning now to FIG. 4, there is shown a graphical illustration of a profile of the compression stroke, screw stroke and clamping force during an injection compression molding process according to the present invention. The compression stroke reflects hereby the movement of the half-molds 7, 9. During the injection phase, the screw stroke approaches zero, while the compression stroke remains on a horizontal line, i.e. there is no movement of the half-molds 7, 9. In other words, the size of the cavity 1 remains constant during the injection phase.

After conclusion of the injection phase and injection of the required additional amount of plastic into the cavity 1 (screw stroke 0), the compression stroke has reached its maximum. In other words, the mold is distended to a maximum. Subsequently, the compression stroke decreases until reaching an end value which corresponds to a distance d, as shown in FIG. 3. The clamping force remains substantially constant during the compression phase.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method of making a molded plastic article, comprising the steps of:
    closing a cavity of a positive mold by applying a clamping force;
    fully filling the cavity with plastic material, while maintaining a size of the cavity constant;
    adding plastic material so as to distend the positive mold in opposition to the clamping force until the cavity of the positive mold expands to reach a defined size for producing a defined article thickness;
    closing the positive mold until reaching a residual distending opening and molding the plastic material into a plastic article while applying the clamping force to thereby maintain the plastic material compressed; and
    removing the plastic article.

2. The method of claim 1, wherein the adding step is controlled in dependence on a distance traveled by an advancing screw.

3. The method of claim 1, wherein the adding step is controlled in dependence on a distending motion of the positive mold.

4. The method of claim 1, and further comprising the steps of measuring an internal pressure in the positive mold, and applying the clamping force in dependence on a profile of the internal pressure.

5. The method of claim 1, and further comprising the step of applying a higher clamping force upon the positive mold at a location closer to a sprue than at a location farther away from the sprue.

6. The method of claim 1, wherein the molding step is carried out at constant clamping force.

7. The method of claim 1, wherein the plastic article is a thick-walled, flat molded article.

8. The method of claim 1, wherein the plastic article is a disc.

* * * * *